United States Patent
Evans et al.

(10) Patent No.: US 6,323,941 B1
(45) Date of Patent: Nov. 27, 2001

(54) SENSOR ASSEMBLY FOR IMAGING PASSIVE INFRARED AND ACTIVE LADAR AND METHOD FOR SAME

(75) Inventors: Bruno J. Evans; Gary Kim Jenkins, both of Arlington; Mark Alan Dodd, Dallas, all of TX (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/370,108

(22) Filed: Aug. 6, 1999

(51) Int. Cl.[7] .............................. G01J 5/02; G01C 3/08; G01B 11/26; G01B 11/24
(52) U.S. Cl. .................. 356/4.01; 250/339.02; 250/339.05; 250/342; 356/141.1; 356/141.5; 356/5.01; 356/376
(58) Field of Search .............................. 356/141.1, 4.01, 356/5.01, 376, 141.5; 250/339.02, 339.05, 342

(56) References Cited

U.S. PATENT DOCUMENTS

| | | | |
|---|---|---|---|
| 3,953,667 | 4/1976 | Layton et al. | 178/6 |
| 4,298,280 | 11/1981 | Harney | 356/5 |
| 4,614,426 | 9/1986 | Baxter et al. | 356/1 |
| 4,625,389 | 12/1986 | Readhead | 29/572 |
| 4,737,028 | 4/1988 | Smith | 356/152 |
| 4,939,369 | * 7/1990 | Elabd . | |
| 4,956,555 | 9/1990 | Woodberry | 250/339 |
| 5,013,918 | 5/1991 | Choi | 250/338.4 |
| 5,110,203 | 5/1992 | MacCabee | 356/5 |
| 5,345,304 | 9/1994 | Allen | 356/5 |
| 5,446,529 | 8/1995 | Stettner et al. | 356/4.01 |
| 5,528,354 | 6/1996 | Uwira | 356/5.01 |
| 5,539,206 | 7/1996 | Schimert | 250/338.4 |
| 5,682,225 | 10/1997 | DuBois et al. | 356/73 |
| 5,696,577 | 12/1997 | Stettner et al. | 356/4.01 |
| 5,751,830 | 5/1998 | Hutchinson | 382/103 |
| 5,835,204 | * 11/1998 | Urbach | 356/5.01 |
| 6,137,566 | * 10/2000 | Leonard et al. | 356/5.01 |

OTHER PUBLICATIONS

William Thomas Roberts, Jr. & Paul D. Levan; Aperture Sharing Between Low–Background Infrared Sensors and Ladar Sensors; *1996 IEEE Aerospace Applicatons Confrence*; pp. 495–507; vol. 4.

Steven K. Rogers et al.; Multisensor Fusion of Ladar and Passive Infrared Imagery for Target Segmentation; *Optical Engineering*; pp. 881–886; vol. 28 No. 8.

A.V. Jelalian & D.R. Bates; Infrared Laser Radar Systems; Sep. 1990; p. 1–19.

G.R. Osche et al.; CO2 Laser—Forward Looking Infrared (FLIR) Integration Concepts; *CO2 Laser Devices and Applications*; Apr. 1980; pp. 57–64; vol. 227.

(List continued on next page.)

*Primary Examiner*—Stephen C. Buczinski

(57) ABSTRACT

A sensor assembly for imaging passive infrared (IR) scenes and active laser radar (LADAR) scenes and for generating multi-dimension image data sets, and a method for same. A two-dimensional semiconductor imager sensitive to both passive IR radiation and active LADAR radiation when used in conjunction with subsequent signal processing creates a two-dimension passive image data set and a three-dimension active image data set with common x and y coordinates. The passive image data set is collected substantially proximate in time with the active image data set. The two image data sets are combined to form a multi-dimension image data set with the surface of three-dimensional objects indicating heat emission. The sensor assembly applies to burst illumination LADARs operating at a variety of wavelengths and passive IR detection in the middle wavelength IR (MWIR) or long wavelength IR (LWIR).

33 Claims, 6 Drawing Sheets

OTHER PUBLICATIONS

Kathy Byrd et al.; Intelligent Processing Techniques for Sensor Fusion: *Sensor Fusion: Architectures, Algorithms, and Applications II*; Apr. 1998; pp. 1–15; vol. 376; SPIE—The International Society for Optical Engineering.

Joseph Kostakis et al.; Multispectral Active–Passive Sensor Fusion for Ground–Based Target Orientation Estimation; *Automatidc Target Recognition VIII*; Apr. 1998; pp. 500–507; vol. 3371; SPIE—The International Society for Optical Engineering.

Stephen M. Hannon & Jeffrey H. Shapiro; Active–Passive Detection of Multipixel Targets; *Laser Radar V*; Jan. 1990; pp. 2–23; vol. 1222; SPIE—The International Society for Optical Engineering.

J.E. Baum & S.J. Rak; Simultaneous Active/Passive–IR Vehicle Detection; *Laser Radar VI*; Jan. 1991; pp. 209–220; vol. 1416; The International Society for Optical Engineering.

Alexander Akerman, III et al.; Multisensor Fusion Using FLIR and LADAR Identification; Mar. 31, 1997; pp. 3–42; Nichols Research Corporation.

Doug Allen et al.; Multi–Level Sensor Fusion Algorithm Approach for BMD Interceptor Applications; 1998; pp. 1–12.

* cited by examiner

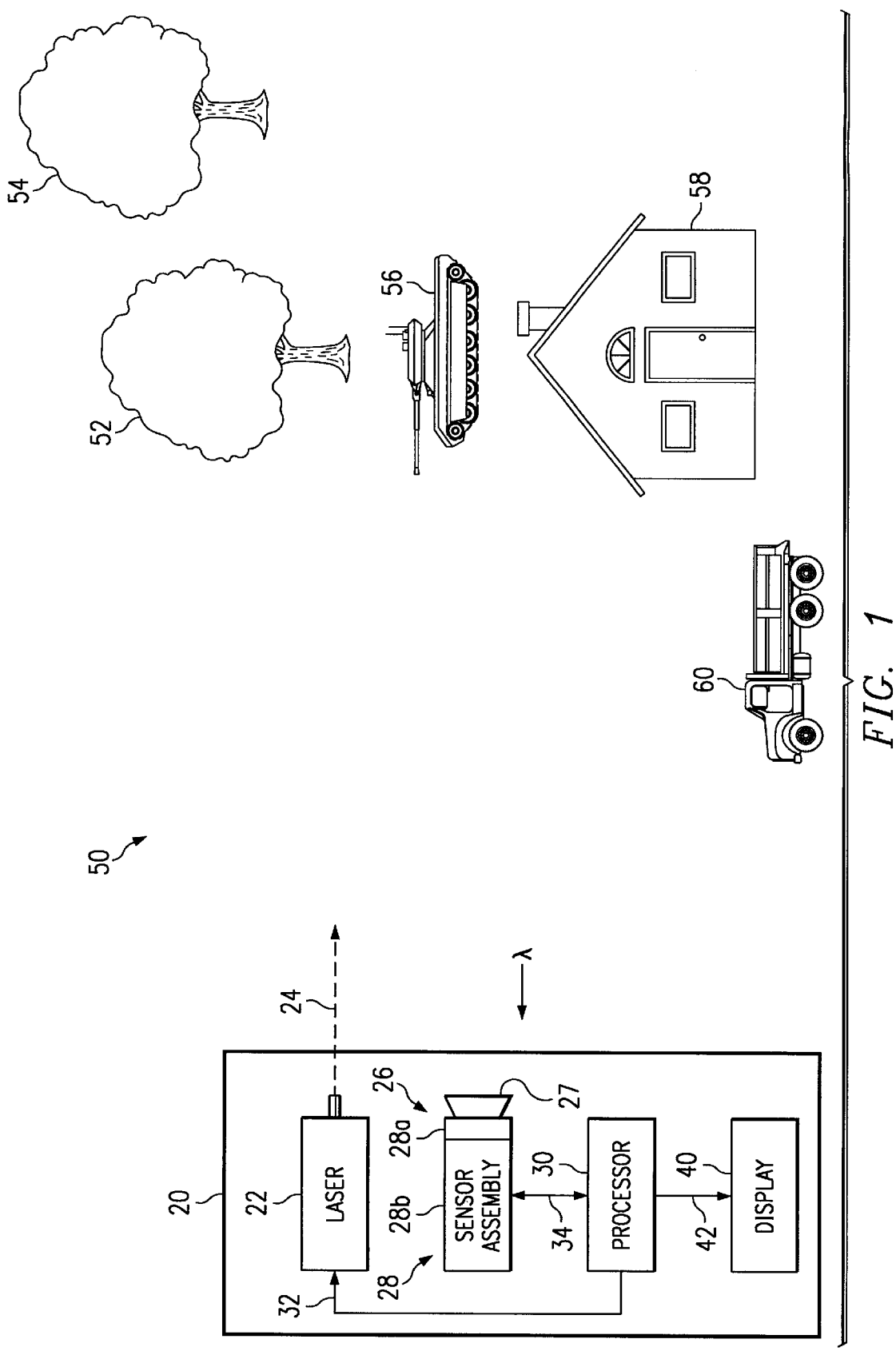

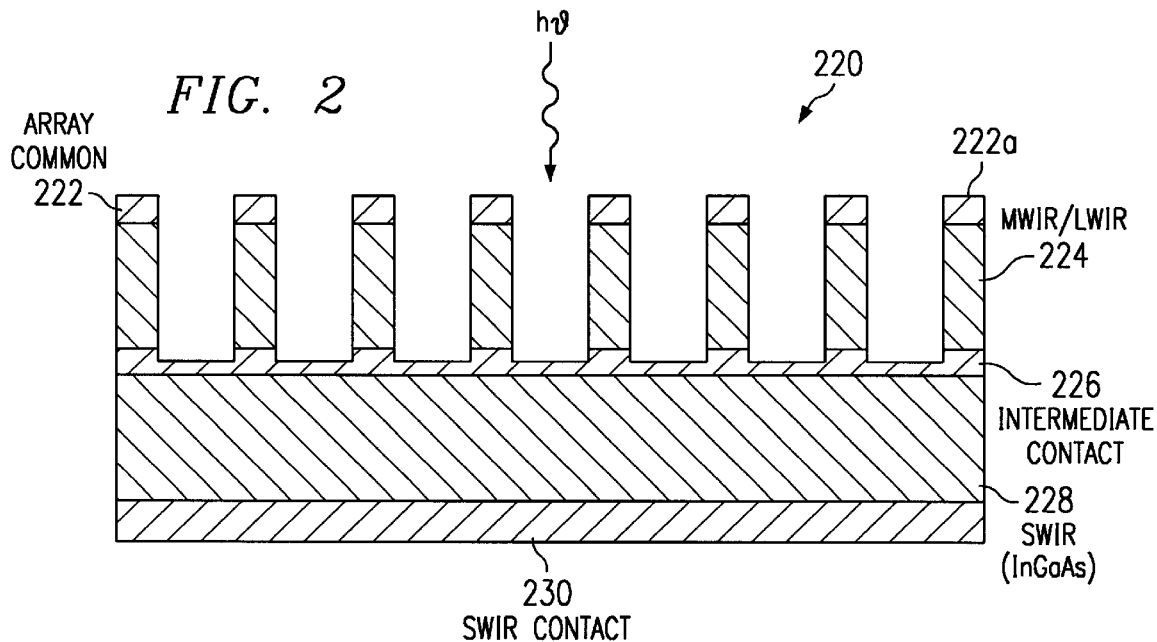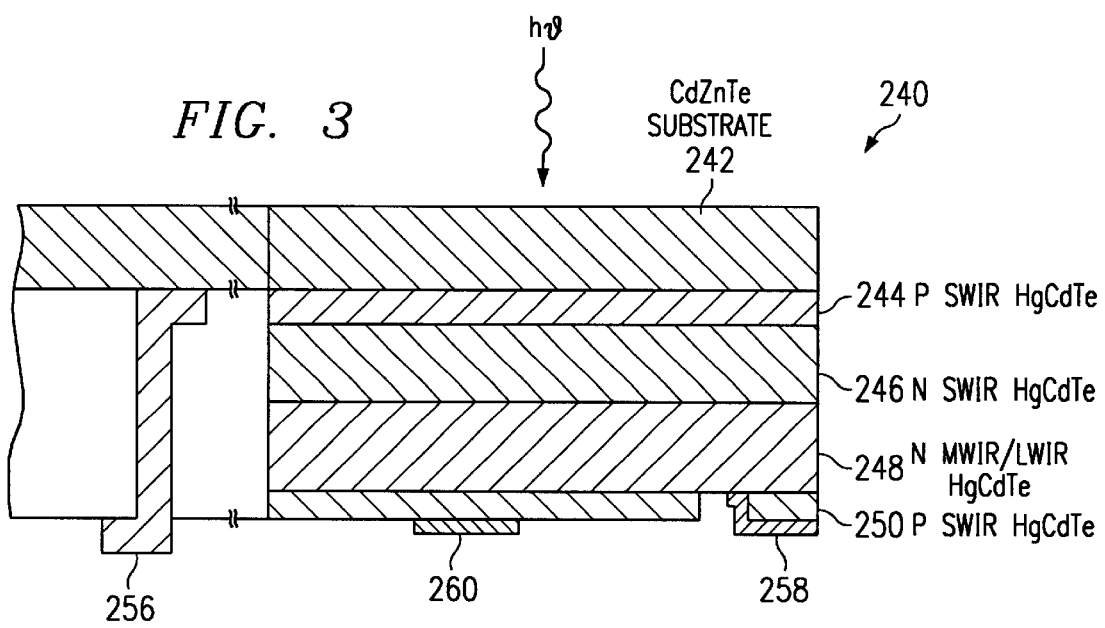

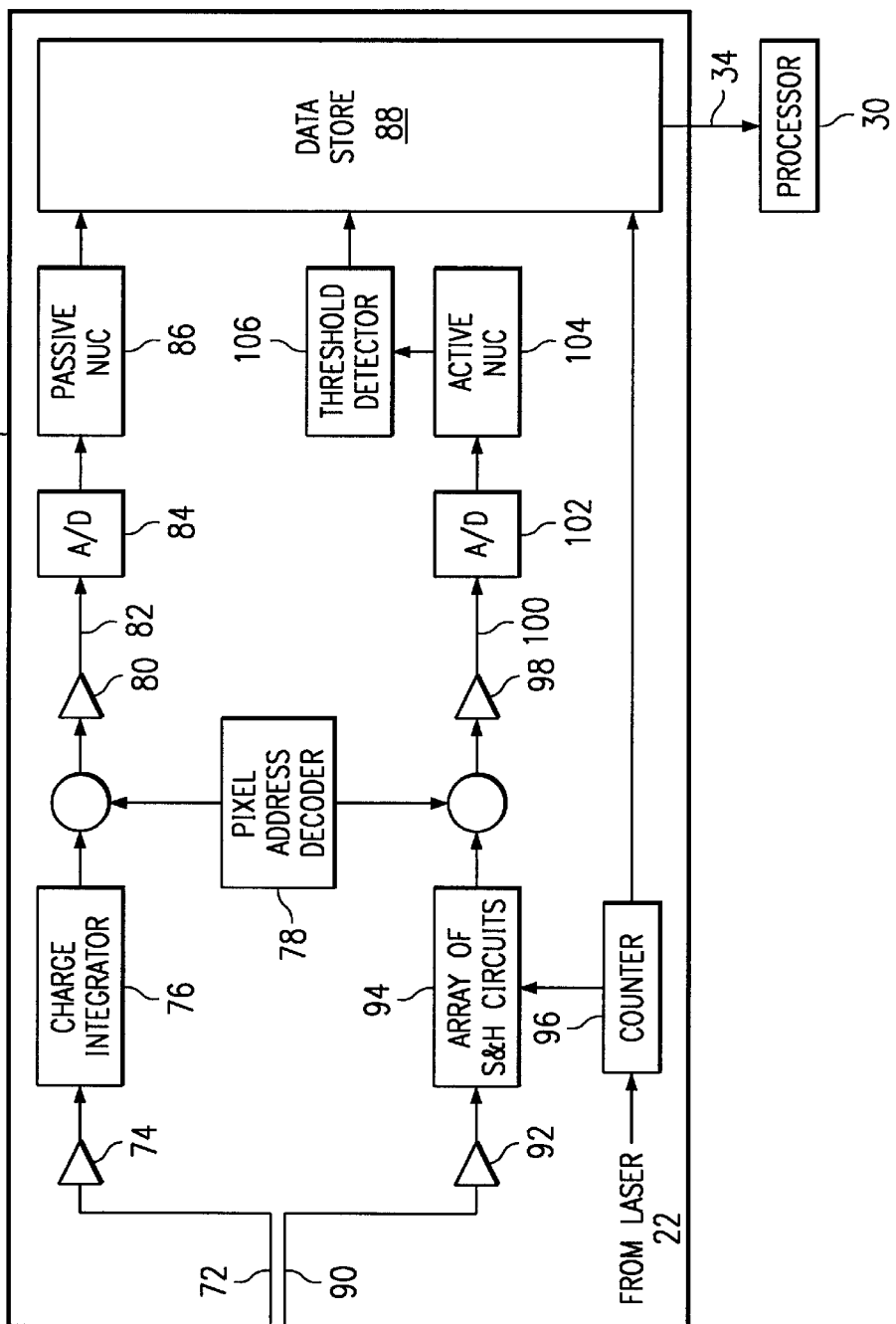
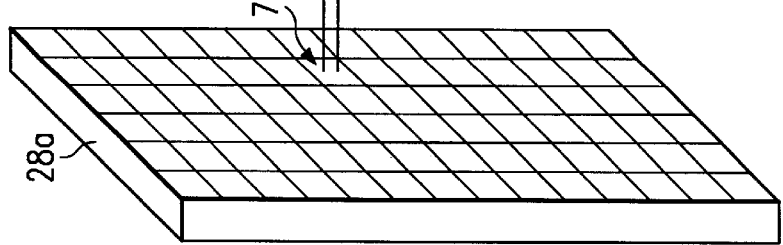
FIG. 4

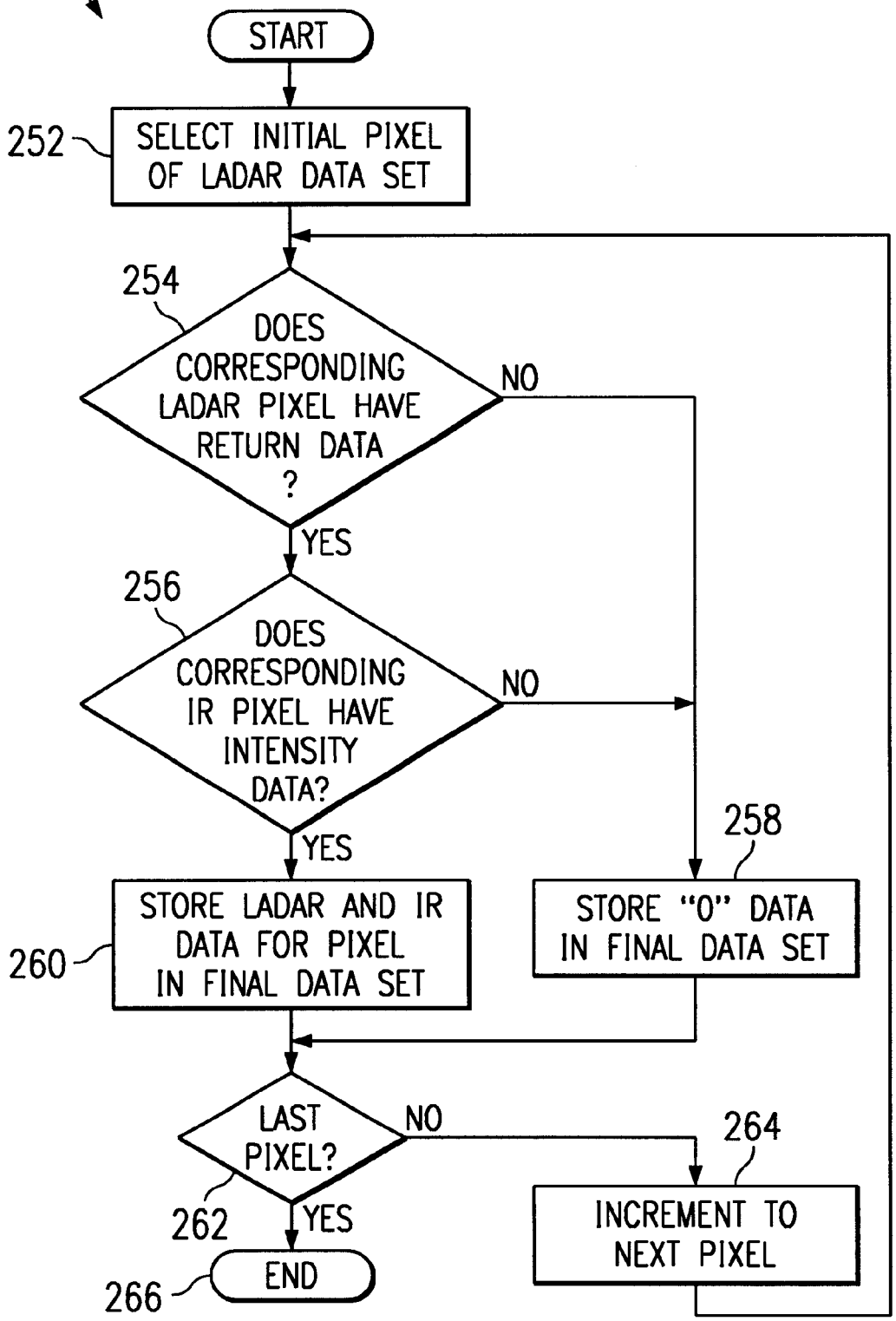

SENSOR ASSEMBLY FOR IMAGING PASSIVE INFRARED AND ACTIVE LADAR AND METHOD FOR SAME

TECHNICAL FIELD OF THE INVENTION

The present invention pertains in general to the electronic detection of images using both passive detection and active illumination and more particularly to a sensor assembly for detecting a combined image from these multiple sources.

BACKGROUND OF THE INVENTION

Several technologies exist for electronically collecting images. A common electronic imaging technique is the use of a television camera to collect visible optical wavelength images that become electronic signals that can be processed and stored. This type of imaging is inexpensive, can record color and can have high image resolution. However, such imaging has severe limitations under adverse conditions such as darkness, haze, dust, and clouds. It is often very important in military applications to be able to obtain an image of targets under such adverse conditions.

Another type of image collection has been developed using infrared radiation. Infrared detectors can collect images at wavelengths that can pass through optical barriers such as haze and smoke and can also produce images during hours of darkness. The technology of infrared imaging has been developed such that relatively high resolution images can be collected and such images can be collected which have multiple wavelengths that correspond to colors within the visible optical band. Infrared imaging suffers performance degradation when thermal contrast is low, such as during a rain storm.

A still further technology for imaging is termed LADAR. This stands for laser detection and ranging. This technology uses a laser that generates very short pulses of laser light. The travel time of the laser pulse from the laser to the target and back to a detector can be measured. This makes possible the determination of the range from the laser to the target. While LADAR imaging can be quite effective, it has limitations as well.

Therefore, there exists a need for a sensor assembly with improved image collection capabilities under adverse conditions where the detected image can provide as much information as possible about potential targets in the field of the image.

SUMMARY OF THE INVENTION

A selected embodiment of the present invention is a sensor assembly for detecting a combined passive and active image for subsequently producing passive and active image data sets. The sensor assembly collects an image of the scene passively with an imager that generates a passive image data set of the scene. The passive image data set comprises a plurality of picture elements, each of which has an x (horizontal) and y (vertical) coordinate, and further has passive intensity data for the scene. A laser beam is directed at the scene and laser beam reflections are collected by the sensor assembly with the imager generating an active image data set of the scene. The active image data set comprises a plurality of picture elements wherein each element has x and y coordinates, active intensity data, and z (distance) data for the scene. The picture elements of the passive image data set are substantially registered in x and y coordinate alignment with the picture elements of the active image data set for the scene.

In another embodiment of the present invention, data from the passive image data set are subsequently combined with those of the active image data set to produce a multi-dimension image data set which has a plurality of picture elements. Each picture element has an x and y coordinate. Each picture element of the multi-dimension image data set further includes the passive intensity data from the passive image data set picture element having corresponding x and y coordinates, and the active intensity and z data from the active image data set picture element having corresponding x and y coordinates.

Methods corresponding to both sensor assembly embodiments are also claimed.

BRIEF DESCRIPTION OF THE DRAWINGS

For a more complete understanding of the present invention and the advantages thereof, reference is now made to the following description taken in conjunction with the accompanying drawings in which:

FIG. 1 is a system diagram incorporating the present invention showing the major operational parts of the system as used in a field environment, FIG. 2 is a sectional view of a dual-band infrared sensor for use within the present invention, FIG. 3 is a sectional view of an alternative dual-band infrared sensor for use within the present invention, FIG. 4 is a block diagram illustration of signal processing using the signals derived from a dual-band imager, FIG. 8 is a flow diagram illustrating operation of the signal processing in accordance with the present invention to produce a multi-dimension image data set.

DETAILED DESCRIPTION

Figure 5:
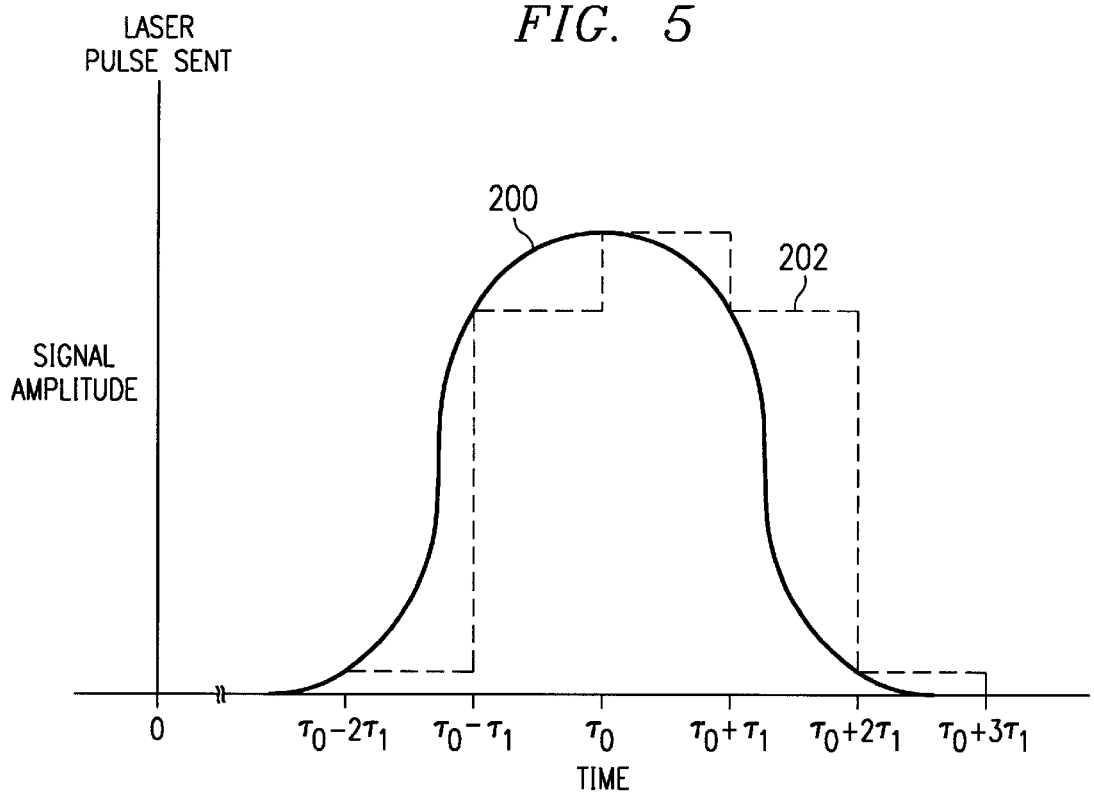
FIG. 5 is a timing diagram of the return pulse from a burst illumination LADAR process for generating a LADAR image of a potential target.

Referring to FIG. 1, there is illustrated an imaging system 20 using a sensor assembly 28 in accordance with the present invention. The imaging system 20 includes a laser 22 that produces a laser beam 24 comprising very short pulses of laser light. A detector subsystem 26 includes a lens assembly 27, and a sensor assembly 28, including a semiconductor imager 28a, and detector electronics 28b. A processor 30 is connected through a line 32 for operating the laser 22. The processor 30 is connected through a bi-directional data and control line 34 to the detector electronics 28b of the sensor assembly 28 and functions to process the collected data. The imaging system 20 further includes a display 40 connected via a line 42 to the processor 30.

Also included in FIG. 1 is a scene 50 of an outdoor area. The scene includes trees 52 and 54, a military tank 56, a building 58, and a truck 60. The tree 52, tank 56, and building 58 are all at the same distance from the system 20.

A primary application of the imaging system 20, as shown in FIG. 1, is to detect the presence of the tank 56 within the scene 50 under adverse conditions such as darkness, smoke, haze, and other barriers (such as the trees and building) which would prevent a direct visible optical viewing of the tank 56.

As described in further detail below, the imaging system 20 views the scene 50 in two different modes. The first mode of image collection comprises a passive infrared (IR) imaging of the scene 50 with the semiconductor imager 28a within the sensor assembly 28. This produces a two-dimension passive image data set with each pixel (picture element) having passive intensity information corresponding to the magnitude of the passive IR energy collected for that pixel. The second mode of image collection is with the laser 22 that produces an active LADAR image by detecting the reflected laser energy with the sensor assembly 28. This produces a three-dimension active image data set in which each pixel of the image has both z (range) and active intensity data. In both the passive and active image data sets, each pixel has x (horizontal) and y (vertical) coordinates.

The imaging system 20, is typically operated in its passive IR image collection mode initially. This allows a preliminary search of a scene 50 to be conducted without use of the laser 22 that is easily detected. Once a possible target, such as tank 56, is detected in the IR mode, the scene 50, with the tank 56 preferably centered in the scene 50, is re-imaged in both the passive IR and active LADAR modes for further identification. The passive IR mode preferably has a wide field of view. The active LADAR mode, with its laser 22, has a narrow field of view, a subset of the passive IR field of view.

Both the passive IR image data set and the near simultaneously collected active LADAR image data set are transmitted via the line 34 to the processor 30. Within the processor 30, data from both the passive image data set and the active image data set are combined to produce a multi-dimension image data set. Because the passive and active image data sets are collected by the same sensor assembly 28 at approximately the same time (temporally aligned), the pixels within the two image data sets are also spatially aligned, that is, objects in the scene 50 are in the same positions x and y for both the passive IR image and the active LADAR image. As a result, the image data sets can be readily combined. The resulting combined image data, which comprises a multi-dimension image data set, is provided as a signal through the line 42 for producing an image on the display 40. This image, preferably, can be rotated on a display screen in a manner that produces a three-dimensional representation of objects within the scene 50, in particular a threat object such as the tank 56. The three-dimensional representation of an object further provides an indication of the thermal intensity of the object, i.e., a three-dimensional IR image.

Additionally, the processor 30 can process the multi-dimension image data set to identify or aid in identifying threat objects such as the tank 56. The processing identifies tank 56 as not only a tank, but whether it is a friend or foe tank. This additional processing substantially decreases the probability of fratricide or being killed by friendly fire.

The sensor assembly 28 shown in FIG. 1 uses a semiconductor imager 28a that preferably has two bands of receiving sensitivity. One band is for receiving the passive IR radiation generated by the objects in the scene 50, and the other band is for receiving the radiation generated by the laser 22 and reflected by objects in the scene 50. Two thermal bands of interest for IR radiation are the atmospheric transmission bands of 3–5 microns for middle wavelength IR (MWIR), and 8–12 microns for long wavelength IR (LWIR) radiation. The LADAR laser has a preferable operating wavelength of 1.55 microns, which is in the short wavelength IR (SWIR) band. Alternative wavelengths are 1.05 microns in the SWIR and 4.1 microns in the MWIR. A sensor having only one band of reception could be used if the laser 22 emitted radiation that is in the same band of interest as the passive IR imaging, e.g., a $CO_2$ laser operating at 10.6 microns in conjunction with a LWIR imager.

FIG. 2 illustrates a section view of a dual-band IR semiconductor imager 220 that can be used in accordance with the present invention. The one pixel is replicated to produce a complete two-dimensional imager 28a of the desired size, such as 64 pixels by 64 pixels or larger. Alternatively, an active LADAR sensitive portion of the desired two-dimensional imager 28a is a centered sub-array of 64 pixels by 64 pixels within a larger 256 pixel by 256 pixel, or larger, passive IR sensitive array.

The imager 220 includes an upper layer array common contact 222, one element of which is represented by the contact 222a. This forms a common electrical contact for the passive band (MWIR or LWIR) of signals detected by imager 220. This design is based on III–V semiconductor materials and is preferably composed of either GaAs/AlGaAs or InGaAs/InP. In an imager 220 using either of these materials, the passive portion of the imager comprises a photoconductor based on inter-subband transitions. This type of imager is known as a quantum well IR photodetector, or QWIP. The absorbing transition may be in either the conduction or valence energy bands. Due to the absorption mechanism, an optical coupler, typically a diffraction grating, is used to increase sensitivity. This grating may be either a surface grating or the much deeper cavity-based grating as used in an enhanced QWIP or EQWIP, such as described in U.S. Pat. No. 5,539,206 entitled "Enhanced Quantum Well Infrared Photodetector" which issued Jul. 23, 1996, and is incorporated herein by reference.

Further referring to FIG. 2, the MWIR or LWIR absorbing region 224 comprises a stack of multiple quantum wells as described in the referenced patent, preferably a group of 20–50 quantum wells. They are placed between the array contact 222 and an intermediate contact 226. The signal produced by absorption of the MWIR or LWIR radiation is generated between the contacts 222 and 226.

In a preferred embodiment the GaAs quantum wells are 30–50 angstroms wide and separated by 300–600 angstrom AlGaAs barriers. The wells and contact layers are doped in the range of $5 \times 10^{17}$, and $2 \times 10^{18}$, respectively. Alternatively, the structure may be composed of InGaAs wells and InP barriers.

Further referring to FIG. 2, a SWIR absorbing region 228 preferably comprises InGaAs. The region 228 is positioned between the intermediate contact 226 and a contact 230. A SWIR radiation signal is produced between contacts 226 and 230.

The SWIR absorber region 228 is preferably composed of $In_{0.53}Ga_{0.47}As$ that is lattice matched to InP. This composition provides a spectral response that will strongly absorb radiation at the preferred LADAR laser wavelength of 1.55 microns. A typical thickness for the SWIR absorber region 228 is 2–4 microns. The SWIR absorber region 228 in conjunction with intermediate contact 226 and contact 230 can form a photoconductor, a photodiode, or preferably an avalanche photodiode.

A second embodiment of a dual-band IR semiconductor imager 240, shown for one pixel, is illustrated in FIG. 3. This embodiment is preferably composed of the II–VI semiconductor material HgCdTe, and uses a double stack for absorbing the two different bands of IR radiation. The incident IR radiation must be incident on the SWIR absorbing stack first with the longer wavelength radiation (MWIR or LWIR) passing through to be absorbed in the second stack. Both the SWIR and the MWIR or LWIR stacks are formed to comprise P-n junctions, preferably heterojunctions to enhance performance. The sensor 240 has a supporting substrate 242 comprising CdZnTe. A SWIR receiver comprises a P region 244 and an n region 246, both comprising HgCdTe. The longer wavelength incident IR radiation is absorbed by regions 248 and 250, both of which comprise HgCdTe.

Further referring to FIG. 3, the short wavelength IR radiation is absorbed by the Pn junction comprising regions 244 and 246. The signal is conducted away from the pixel through a conductor 256 and a conductor 258. For the SWIR radiation, the region 248 functions essentially as a conductor. A longer wavelength IR radiation signal is produced by the structure comprising regions 248 and 250 with the longer wavelength IR radiation signal generated between the conductor 258 and a conductor 260. Typical compositions for the various layers are $Hg_{0.8}Cd_{0.2}Te$ for the LWIR absorbing layer, $Hg_{0.7}Cd_{0.3}Te$ for the MWIR absorbing layer, and $Hg_{0.35}Cd_{0.65}Te$ for the SWIR absorbing layer.

It is to be noted that both imagers 220 and 240 are simultaneously sensitive to both passive and active radiation wavelengths. The sensor assembly uses a single imager sensitive to both passive and active radiation as opposed to two separate imagers each sensitive to only the passive or active scene radiation.

An example of the detector electronics 28b within sensor assembly 28 for collecting passive IR data and active LADAR data is shown in FIG. 4. The passive image signal from a particular pixel 70 is transferred through a line 72, through an amplifier 74, to a charge integrator 76. The passive image signal is integrated for a predetermined integration time. The integrated signal for a particular pixel 70 is readout when the address decoded by pixel address decoder 78 corresponds to the particular pixel 70. The integrated signal is amplified by output amplifier 80 that drives passive column data bus 82. The analog amplified integrated signal is then digitized by analog-to-digital converter 84. The resultant digital signal is corrected for passive imager non-uniformity and other possible system non-uniformities in passive non-uniformity corrector 86. The corrected passive digital signal corresponding to pixel 70 is then stored in data store 88 creating a two-dimension passive image data set. The passive image data set is then transferred to processor 30 via line 34.

Several input amplifier circuit designs can be used for the amplifier 74. These include direct injection, buffered direct injection, and capacitive transimpedance amplifiers, among others. Each of these designs has advantages and disadvantages, primarily based upon the imager 28a design, the operating temperature of the imager, and allowable power dissipation.

The charge integrator 76 likewise has several design possibilities. These include charging a capacitor to a predetermined voltage and draining the capacitor charge through an imager pixel during the integration time if the device is a photoconductor, charging a capacitor if the device is a photodiode, and others that handle high or low dark currents, subtraction of dark currents, etc. As with the input amplifier 74, selection of the charge integrator design is based upon the imager 28a design, the operating temperature of the imager, and power dissipation.

The passive non-uniformity corrector 86 can implement several different non-uniformity correction techniques. For devices, such as QWIPs and EQWIPs, which have a degree of linear uniformity across the imager 28a, a simple offset correction can suffice. For an imager 28a that has devices with varying linearity across the imager 28a, both offset and gain correction can be implemented. For applications requiring greater non-uniformity correction, a table look-up process can be implemented. Possible system non-uniformity sources include a $cosine^4$ term due to the lens assembly 27.

The active LADAR image signal from a particular pixel 70 is transferred through a line 90, through an amplifier 92, to an array of sample and hold (S&H) circuits 94. The timing of each S&H circuit is triggered by a counter 96, which itself is triggered by the start of a pulse from laser 22. The S&H circuits therefore each correspond to a range in the imaged scene 50. Each S&H circuit for a particular pixel 70 is readout when the address decoded by pixel address decoder 78 corresponds to the particular pixel 70. The signal from each S&H circuit is sequentially amplified by output amplifier 98 that drives active column data bus 100. The analog amplified S&H signal from each S&H circuit is then digitized by analog-to-digital converter 102. The resultant digital signal is corrected for active imager non-uniformity, and other possible system non-uniformities in active non-uniformity corrector 104. The digitized corrected active image signals corresponding to each S&H circuit from pixel 70 are passed through a threshold detection circuit 106. The threshold detected S&H signals, and their corresponding times from counter 96 are then stored in data store 88 creating an active image data set. The active image data set is then transferred to processor 30 via line 34. The processor, using the corresponding times, calculates the range to an object for each pixel thus creating a three-dimension active image data set.

Issues relating to the active channel amplifier 92 and the non-uniformity corrector 104 are similar to those of the passive portion of the detector electronics 28b. Further sources of active system non-uniformity are laser-speckle and any effects associated with the polarized laser radiation.

The array of S&H circuits 94 is subject to several limitations. The number of S&H circuits will be a trade off between the space available for each pixel and the desire for a large depth (range) of image collection with high resolution. For military type targets, a resolution of less than a meter can be required. Coupled with potentially large targets, 32 S&H circuits are the minimum with more than 32 being desired for greater range resolution. The absolute range resolution also limits the arrays of S&H circuits 94 as the time between each sampling command is limited. An upper limit to the sampling rate is approximately 500 MHz using current integrated circuit processing technology. This results in a range resolution of one-third meter.

The requirements for the portion of the detector electronics 28b that processes the active LADAR signals are driven by a burst-illumination LADAR. A burst illumination LADAR system requires only a single laser pulse. An example return pulse waveform 200 is shown in FIG. 5. This waveform 200 is sampled at predetermined times creating a step-wise continuous waveform 202. The difference in time between each sampling $\tau_1$ determines the range resolution. Sampling the return pulse waveform every two nanoseconds (500 MHz) provides one-third meter range resolution. Due to a limited number of S&H circuits, the starting time for the sampling process is determined by the range to the potential target, the number of S&H circuits in the S&H circuit array 94 for each pixel within the semiconductor imager 28a, and the required range resolution. Preferably, half the S&H circuits for each pixel will be used on either side of the optimal time $\tau_0$ based upon the range to the potential target. This will center the potential target within the active image data set. The sampled waveform 202 for each pixel within the semiconductor imager 28a is read out for subsequent processing to produce the active image data set. Alternatively, a preliminary laser pulse may be used in a range finding mode. This allows higher resolution sampling of the burst illumination LADAR pulse as the optimal time $\tau_0$ is more accurately known. If a system is only used for targets within a given fixed range, then $\tau_0$ may be established a priori.

Figure 6:
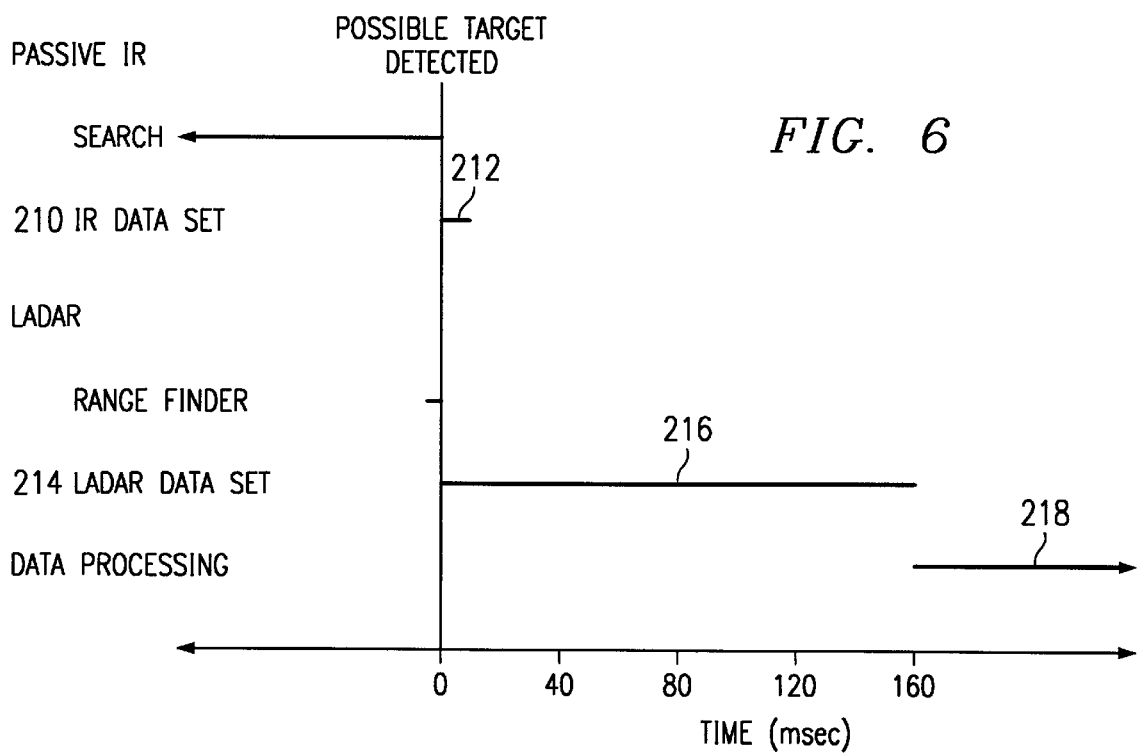
FIG. 6 is a time line of the data collection process for a burst illumination LADAR-based implementation of the present invention.

A burst illumination LADAR target acquisition time line is shown in FIG. 6. The preliminary passive search culminates with a laser range finding pulse in the illustrated embodiment. A preliminary search passive image data set 210 is updated 212 concurrently with a laser pulse for temporal alignment between the active 214 and passive 210 image data sets. In a preferred embodiment, the semiconductor imager 28a comprises 64 pixels in both the x and y coordinates for a total of 4,096 pixels for active imaging. With 32 S&H circuits per pixel and a data read out rate of 1 MHz, the data cycle time for a single pulse is approximately 160 milliseconds to read out 216 the active image data set 214. The passive image data set 210 will also be available for subsequent processing 218 at the conclusion of the active data set's required 160 millisecond readout 216.

As semiconductor processing advances, higher sampling and readout rates will be possible. The present invention can then be used to create real time, video rate three-dimensional imagery. The three-dimensional imagery can be displayed with either the magnitude of the IR emission, or the magnitude of the LADAR return signal.

Figure 7:
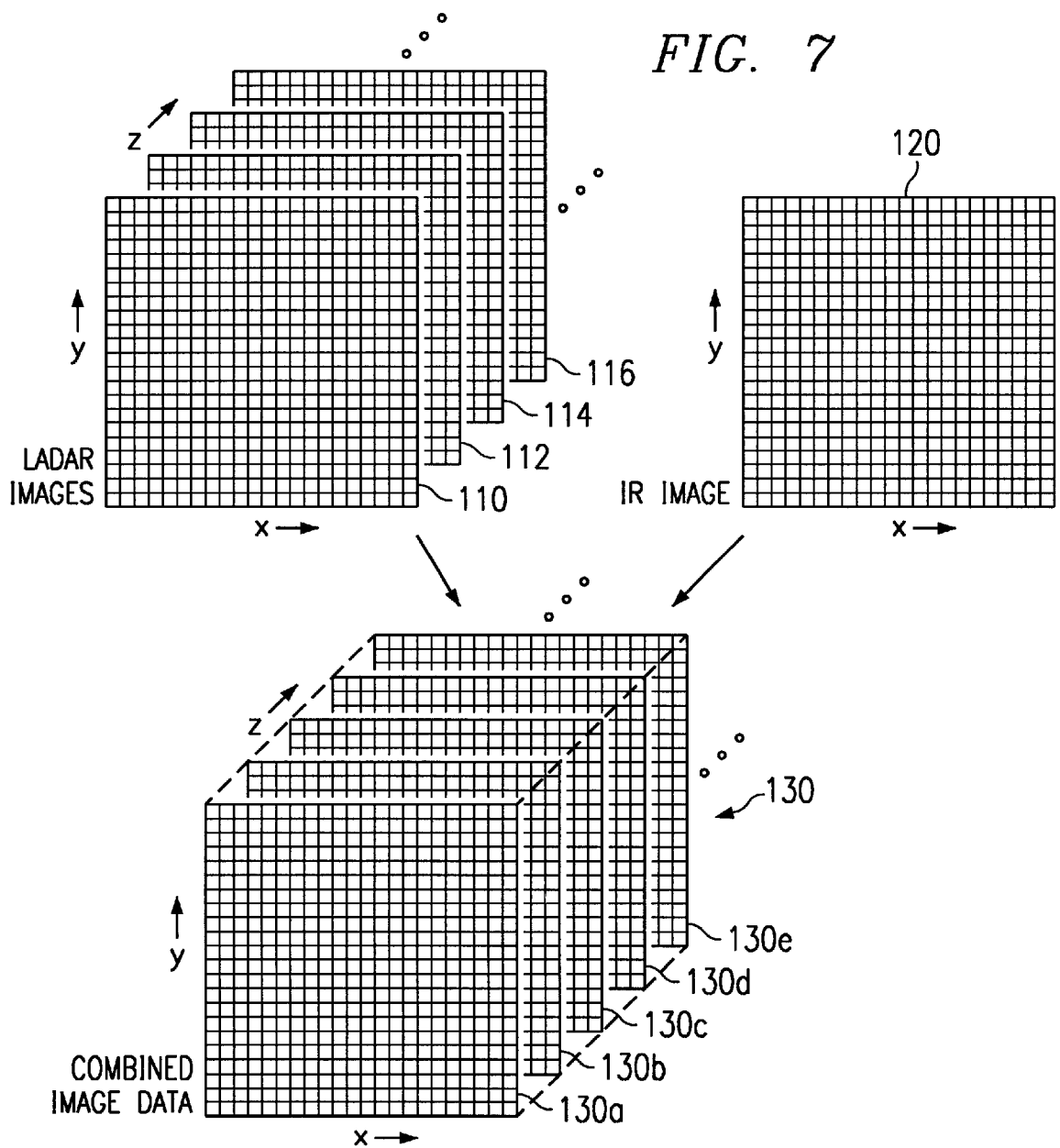
FIG. 7 is an illustration of multiple LADAR images combined with a single IR image to produce a combined multi-dimension image data set.

Referring now to FIG. 7, there is shown an active image data set comprising sub-image active data sets 110, 112, 114, and 116. Each of these active sub-image data sets has an x and y coordinate to define a plurality of pixels for the active image data set. The group of active sub-image data sets as a whole has a z-dimension that represents the range between the laser 22 and the potential target, such as the tank 56. In a selected group, there are 32 such active sub-image data sets. Each of these active sub-image data sets can be established by defining an arbitrary distance and placing the x and y coordinates within the particular active sub-image data set having the corresponding defined z-range. Each pixel in the active sub-image data sets 110–116 can further have an intensity value, or may have a value indicating only that it is greater than or less than a preset threshold. For the present example, the active sub-image data set intensity is a binary 1 or 0 indicating only the presence or absence of a return signal for the particular pixel.

As an example, each active sub-image data set (such as 110–116) represents a specified distance of two meters, thus the collection of 32 images represents reflections received from objects over a distance interval of 64 meters. Further continuing with this example, the active sub-image data set 110 represents returns from objects, for example, at a distance of 800–802 meters from the system 20, the active sub-image data set 112 represents returns from an object at a distance between 802–804 meters, the active sub-image data set 114 for objects at a distance of 804–806 meters, and so forth up to a last active sub-image data set (32nd) which represents reflections from objects at a distance of 862–864 meters. FIG. 7 also shows a passive image data set 120 that has an intensity value for each pixel. Each pixel has x and y coordinates.

By using a single semiconductor imager that is simultaneously sensitive to both the passive and active image wavelengths, signal processing of the resultant data is significantly simplified as electronic alignment and/or image segmenting is not required. Passive and active image data sets will be aligned both temporally and spatially readily allowing the combination of the two image data sets to form a multi-dimension image data set as the x, y, and time coordinates between each image data set is common.

Further referring to FIG. 7, the active sub-image data sets 110–116 and the passive data set 120 are combined to produce a multi-dimension image data set 130 that comprises a plurality of individual layers including 130a, 130b, 130c, 130d, and 130e. In a selected embodiment there are 32 such layers corresponding to the 32 active sub-image data sets. Each of the 32 layers of the multi-dimension image data set 130 have common x and y coordinates defining common pixels. The various layers of multi-dimension image data set 130 have different z-ranges.

Continuing with the above example, the multi-dimension image data set 130 represents laser pulse return image information at a range of 800–864 meters. Each pixel of the data set 130 has at least four quantities. These are the x-coordinate, y-coordinate, z-range, and passive IR intensity. The data set may optionally include active LADAR intensity. For some pixels, the range and passive intensity data may be 0. The z-dimension of each pixel is defined by the active sub-image data set. If a given pixel in all of the active sub-image data sets 110–116 has a 0 z (range) signal value, because there was no laser return signal present, there would similarly be a 0 passive intensity signal present in all of the layers for the corresponding pixel in the multi-dimension image data set 130, even though that particular pixel in the passive image data set 120 could have a passive intensity value. This represents the situation in which the system 20 detected a passive response from an object that was at a distance that was not within the predefined range interval of 800–864 meters. Therefore, the passive intensity is not included within the multi-dimension image data set 130. If a particular pixel in the active sub-image data set 114 has non-zero z-range signal value, the measured intensity of the corresponding pixel in the passive image data set 120 is assigned to the corresponding layer of the multi-dimension image data set 130. This represents a passive IR signal from a target within the designated range interval of 800–864 meters.

Further referring to FIGS. 1 and 7, should the tank 56 and truck 60 both have enhanced thermal activity, that is, certain parts of the vehicles are hot, these vehicles would produce strong intensities in the passive image data set 120. However, if the tank 56 is within the range of 800–864 meters, and the truck 60 is closer than 800 meters to the system 20, while the tank 56 and truck 60 would both have strong intensities in the passive image data set 120, only the tank 56 passive image data would be present in the multi-dimension image data set 130. Thus, by selecting a desired distance range interval of investigation, objects outside that range that appear in the passive image data set are eliminated from the resulting multi-dimension image data set 130.

The data produced in the multi-dimension image data set 130 can further be limited to responses that are only present in the passive image data set 120. In many military applications, the primary objects of interest, those that are potential threats, are objects that have significant heat emissions, such as the tank 56. By using a threshold detector, only objects that have significant heat emissions will have non-zero values in passive image data set 120. The active image data set includes responses from all objects, which includes the tree 52 and the building 58, which are at approximately the same distance as the tank 56 from the imaging system 20. By including in the multi-dimension image data set 130 only those responses that are present within the passive image data set 120, the cooler objects, such as the tree 52 and the building 58, are eliminated from the multi-dimension image data set 130. Thus, for the example presented, the only object represented in the multi-dimension image data set 130 is the tank 56 out of all of the objects present in the scene 50 shown in FIG. 1. The truck 60 and the tree 54 are outside the designated range interval. The tree 52 and the building 54 are eliminated due to low thermal emission.

The data in the multi-dimension image data set 130 can be shown on the display 40 to produce an image of the selected target, which in the present example is the tank 56. Because this data represents three dimensions plus passive IR intensity, the displayed object can be viewed from different perspectives thus giving the appearance of a thermally emissive three-dimensional object.

A flow chart for the signal processing 250 of the present invention is shown in FIG. 8. The processing 250 begins with the selection of an initial pixel location from the active image data set in step 252, as the pixel locations (x and y coordinates) are the same for both the passive and active image data sets. In question step 254, if the pixel has return data, i.e., an object surface is detected, corresponding passive image data is checked in question step 256. If the pixel has no return data, no object is detected and a 0 is stored in the multi-dimension image data set as shown in step 258. If the pixel has a return and the corresponding passive image data set pixel has valid.data, both active and passive image data set data are saved in the multi-dimension image data set in step 260. If the pixel has return data and the corresponding passive image data set pixel data is 0, then no highly emissive target is detected and a 0 is placed in the multi-dimension image data set in step 258. After storing either a 0 in step 258 or valid data in step 260, the pixel location is checked in question step 262. If the pixel is not the last pixel in the active image data set, the next pixel is examined in step 264. If the pixel is the last in the active image data set, the processing 250 to create the multi-dimension image data set is complete at end step 266. The multi-dimension image data set includes an object's x (horizontal), y (vertical), and z (range) data plus the intensity of the IR signal associated with the object in each x, y, and z location.

Although several embodiments of the invention have been illustrated in the accompanying drawings and described in the foregoing Detailed Description, it will be understood that the invention is not limited to the embodiments disclosed, but is capable of numerous rearrangements, modifications and substitutions without departing from the scope of the invention.

What is claimed is:

1. A sensor assembly for detecting a scene which emits passive radiation and reflects active radiation, the sensor assembly comprising:
    an imager for imaging the scene, said imager for producing a passive image signal based upon passive scene radiation and an active image signal based upon active scene radiation;
    a passive signal channel for integrating the passive image signal for producing a passive image data set from said integrated passive image signal; and
    an active signal channel for sampling the active image signal at predetermined times for producing an active image data set from said sampled active image signal, said active image data set comprising horizontal, vertical, and range data.

2. A sensor assembly in accordance with claim 1 wherein said passive image signal and said active image signal are produced simultaneously.

3. A sensor assembly in accordance with claim 1 wherein said imager comprises a linear array of imaging pixels.

4. A sensor assembly in accordance with claim 1 wherein said imager comprises an area array of imaging pixels.

5. A sensor assembly in accordance with claim 1 wherein said imager comprises a single semiconductor imager.

6. A sensor assembly in accordance with claim 5 wherein said single semiconductor imager comprises III–V semiconductor material.

7. A sensor assembly in accordance with claim 5 wherein said single semiconductor imager comprises II–VI semiconductor material.

8. A sensor assembly in accordance with claim 1 wherein said active scene radiation is imaged from a spatial subset of said scene relative to said imaged passive scene radiation.

9. A sensor assembly in accordance with claim 1 wherein said passive image signal is based upon passive scene radiation having a wavelength between substantially 3 microns and substantially 5 microns.

10. A sensor assembly in accordance with claim 1 wherein said passive image signal is based upon passive scene radiation having a wavelength between substantially 8 microns and substantially 12 microns.

11. A sensor assembly in accordance with claim 1 wherein said active scene radiation is reflected laser radiation.

12. A sensor assembly in accordance with claim 11 wherein said laser radiation has a wavelength of substantially 1.55 microns.

13. A sensor assembly in accordance with claim 11 wherein said laser radiation has a wavelength of substantially 10.6 microns.

14. A sensor assembly in accordance with claim 11 wherein said laser radiation has a wavelength of substantially 1.05 microns.

15. A sensor assembly in accordance with claim 11 wherein said laser radiation has a wavelength of substantially 4.1 microns.

16. A sensor assembly in accordance with claim 1 wherein said passive signal channel converts said passive image data set into a digital passive image data set.

17. A sensor assembly in accordance with claim 16 wherein said passive signal channel corrects said digital passive image data set for non-uniformity.

18. A sensor assembly in accordance with claim 1 wherein said active signal channel converts said active image data set into a digital active image data set.

19. A sensor assembly in accordance with claim 18 wherein said active signal channel corrects said digital active image data set for non-uniformity.

20. A sensor assembly in accordance with claim 1 wherein said active signal channel threshold detects said active image data set to remove noise data from said active image data set.

21. A sensor assembly in accordance with claim 1 wherein said sensor assembly images said scene at a rate corresponding to a video rate.

22. A sensor assembly in accordance with claim 1 wherein said passive image signal is based upon passive scene radiation having a wavelength between substantially 3 microns and substantially 5 microns, and said active image signal is based upon active scene radiation having a wavelength of substantially 1.55 microns.

23. A sensor assembly in accordance with claim 1 wherein said passive image signal is based upon passive scene radiation having a wavelength between substantially 3 microns and substantially 5 microns, and said active image signal is based upon active scene radiation having a wavelength of substantially 1.05 microns.

24. A sensor assembly in accordance with claim 1 wherein said passive image signal is based upon passive scene radiation having a wavelength between substantially 8 microns and substantially 12 microns, and said active image signal based upon active scene radiation having a wavelength of substantially 1.55 microns.

25. A sensor assembly in accordance with claim 1 wherein said passive image signal is based upon passive scene radiation having a wavelength between substantially 8 microns and substantially 12 microns, and said active image signal is based upon active scene radiation having a wavelength of substantially 1.05 microns.

26. A sensor assembly in accordance with claim 1 wherein said passive image signal is based upon passive scene radiation having a wavelength between substantially 8 microns and substantially 12 microns, and said active image signal based upon active scene radiation having a wavelength of substantially 4.1 microns.

27. A sensor assembly in accordance with claim 1 wherein said passive image signal is based upon passive scene radiation having a wavelength between substantially 8 microns and substantially 12 microns, and said active image signal is based upon active scene radiation having a wavelength of substantially 10.6 microns.

28. A sensor assembly for detecting a scene which emits passive radiation and reflects active radiation, the sensor assembly comprising:
   an imager for imaging the scene, said imager for producing a passive image signal based upon passive scene radiation and an active image signal based upon active scene radiation;
   a passive signal channel for integrating the passive image signal for producing a passive image data set from said integrated passive image signal;
   an active signal channel for sampling the active image signal at predetermined times for producing an active image data set from said sampled active image signal, said active image data set comprising horizontal, vertical, and range data; and
   a processor for receiving said produced passive image data set and said produced active image data set, and for producing a multi-dimension image data set which comprises horizontal, vertical, and range data and passive image signal data corresponding to said horizontal and vertical data.

29. A sensor assembly in accordance with claim 28 wherein said multi-dimension image data set further comprises active image signal data corresponding to said horizontal and vertical data.

30. A method for producing passive and active image data sets, the method comprising the steps of:
   simultaneously detecting passive scene radiation for producing a passive image signal and active scene radiation for producing an active image signal with a single imager;
   integrating said passive image signal for producing a passive image data set; and
   sampling said active image signal at predetermined times for producing an active image data set, said active image data set comprising horizontal, vertical, and range data,
   wherein said passive image data set and said active image data set have corresponding horizontal and vertical data.

31. A method for producing a multi-dimension image data set, the method comprising the steps of:
   simultaneously detecting passive scene radiation for producing a passive image signal and active scene radiation for producing an active image signal with a single imager;
   integrating said passive image signal for producing a passive image data set;
   sampling said active image signal at predetermined times for producing an active image data set, said active image data set comprising horizontal, vertical, and range data; and
   combining said passive image data set and said active image data set for producing a multi-dimension data set,
   wherein said passive image data set and said active image data set have corresponding horizontal and vertical data.

32. An imaging system for producing an image of a scene by use of radiation in a first band and radiation in a second band, comprising:
   a laser generator for producing pulses of a laser beam that illuminates at least a substantial portion of said scene, said laser beam having a wavelength in said first band and said pulses having a timed sequence;
   an imager for producing image data of said scene by receiving passive radiation, which has a wavelength in said second band, from said scene and by receiving reflections of said laser beam from said scene wherein said imager produces a first image signal corresponding to detection of said passive radiation and a second image signal corresponding to detection of said active radiation, which comprises said reflections of said laser beam;
   a passive image channel for producing a passive radiation image data set from said first image signal;
   an active image channel for producing an active radiation image data set from said second image signal, said active image data set comprising horizontal, vertical, and range data;
   said passive radiation image data set defining a passive radiation image of said scene and said active radiation image data set defining an active radiation image of said scene and wherein said passive radiation image and said active radiation image are horizontally and vertically registered with each other; and
   a processor for combining registered data points of said passive radiation image data set and said active radiation image data set and utilizing data based on said timed sequence of said laser pulses to produce a composite image data set which comprises said image of said scene.

33. An imaging system as recited in claim 32 including a digital data store for receiving and storing therein said passive radiation image data set, said active radiation image data set and said data based on said timed sequence of said laser pulses, wherein said data store is connected to provide data stored therein to said processor.

* * * * *

UNITED STATES PATENT AND TRADEMARK OFFICE
CERTIFICATE OF CORRECTION

PATENT NO. : 6,323,941 B1
DATED : November 27, 2001
INVENTOR(S) : Bruno J. Evans et al.

Page 1 of 1

It is certified that error appears in the above-identified patent and that said Letters Patent is hereby corrected as shown below:

<u>Title page,</u>
After "*Primary Examiner*-Stephen C. Buczinski", insert -- [74] *Attorney, Agent, or Firm*-Sidley Austin Brown & Wood and Stephen S. Sadacca --.

<u>Column 9,</u>
Line 29, delete "valid.data" and insert -- valid data --.

Signed and Sealed this

Sixteenth Day of April, 2002

*Attest:*

JAMES E. ROGAN
*Director of the United States Patent and Trademark Office*

*Attesting Officer*